Figure 1:
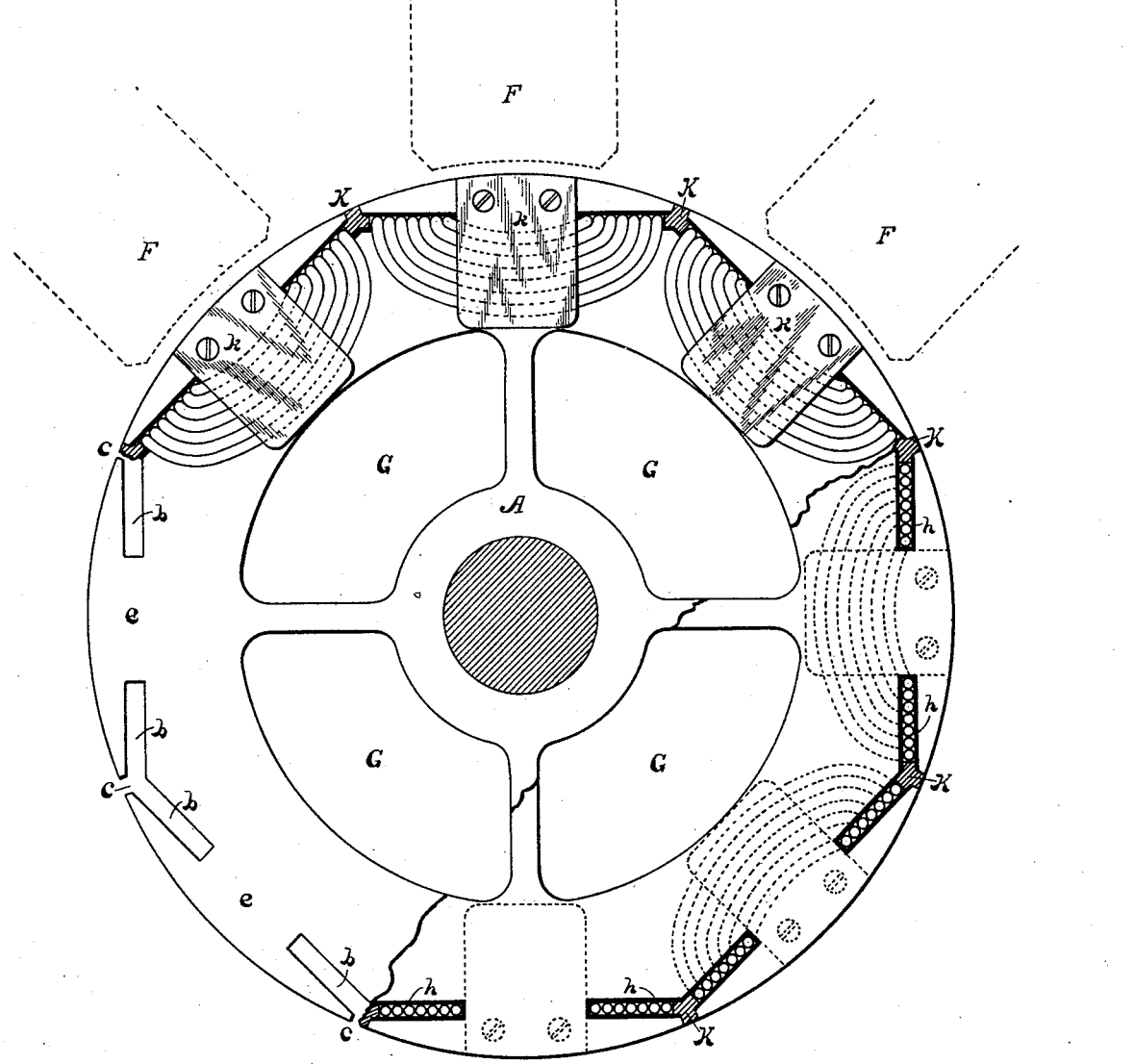

(No Model.) 2 Sheets—Sheet 1.

A. SCHMID & N. TESLA.
ARMATURE FOR ELECTRIC MACHINES.

No. 417,794. Patented Dec. 24, 1889.

WITNESSES:
George Brown, Jr.
Wm. Smith.

INVENTORS
Albert Schmid,
Nikola Tesla.
Charles A. Terry
Att'y.

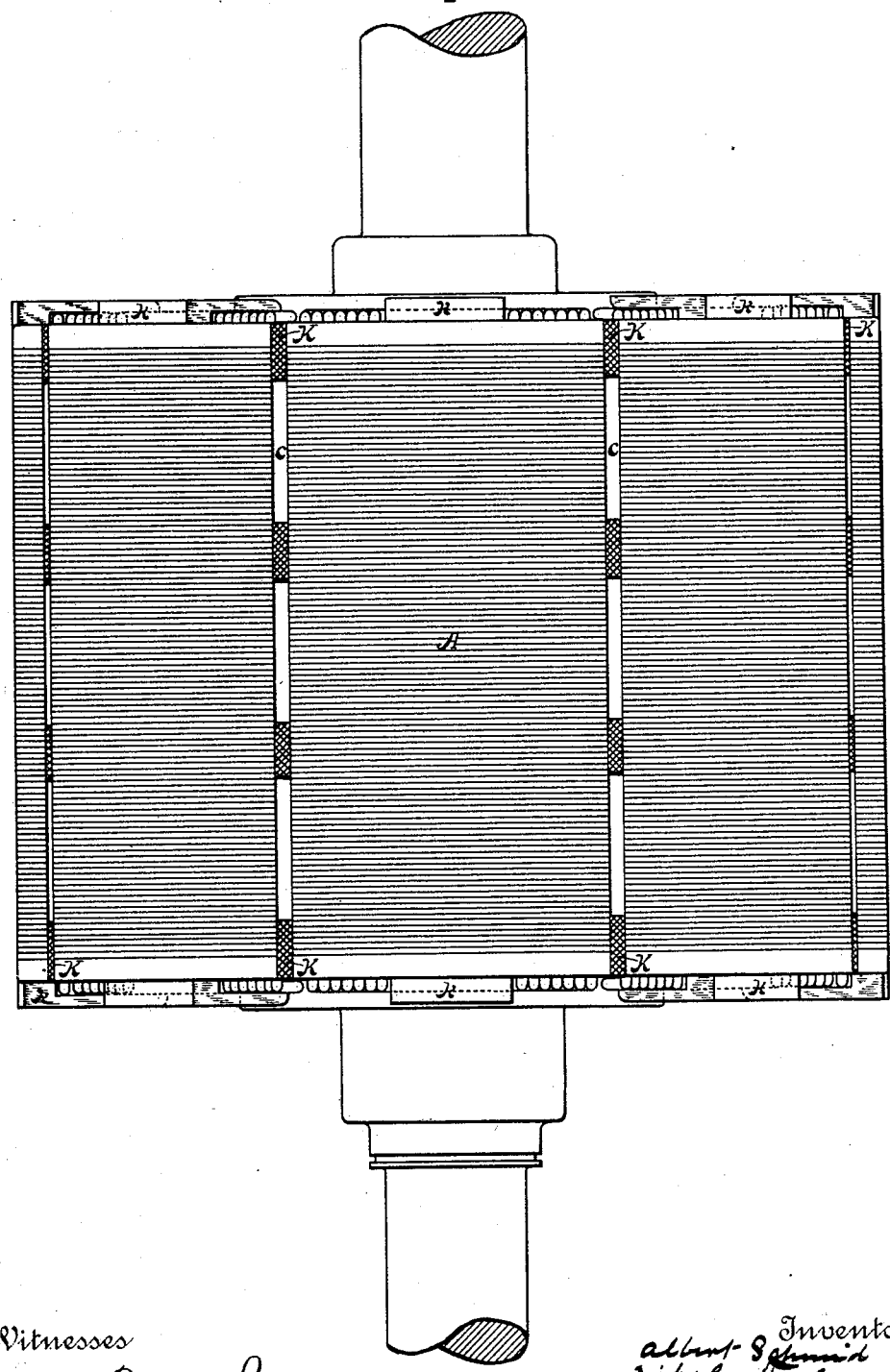

UNITED STATES PATENT OFFICE.

ALBERT SCHMID, OF ALLEGHENY, AND NIKOLA TESLA, OF PITTSBURG, ASSIGNORS TO THE WESTINGHOUSE ELECTRIC COMPANY, OF PITTSBURG, PENNSYLVANIA.

ARMATURE FOR ELECTRIC MACHINES.

SPECIFICATION forming part of Letters Patent No. 417,794, dated December 24, 1889.

Application filed June 28, 1889. Serial No. 315,937. (No model.)

*To all whom it may concern:*

Be it known that we, ALBERT SCHMID and NIKOLA TESLA, citizens, respectively, of the Republic of Switzerland and Smiljan, Lika, border country of Austria-Hungary, now residing in Allegheny and Pittsburg, both in the county of Allegheny and State of Pennsylvania, have invented a certain new and useful Improvement in Armatures for Electric Machines, (Case No. 310,) of which the following is a specification.

The invention relates to the construction of armatures for electric generators and motors, and the object is to provide an electrically-efficient armature, the construction of which is simple and economical, and in which the coils of insulated conducting wire or ribbon may be conveniently wound or formed into bobbins so located with reference to the body of the armature as to afford as good results as possible.

For certain purposes it is desirable to construct the armatures of electric generators and motors with their cores of magnetizable material projecting through the coils into close proximity to the field-magnet poles. When armatures are constructed in this manner, some means are necessary for holding the coils in position and preventing them from being thrown out by centrifugal force.

This invention aims to provide such means in an armature having polar projections, and also to form an armature in such manner as to expose a large area of core-surface to the field-magnet poles.

The invention consists, in general terms, in forming an armature-core which is preferably built up of laminæ of magnetizable material insulated from each other, with diverging slots or openings for receiving the armature wire or ribbon, which slots are connected with the exterior of the armature by openings through which the wire may be laid in the slots, and in placing the wire in such slots in the proper manner.

We are aware of the United States Patents No. 327,797, granted to Immisch, and No. 292,077, granted to Wenstrom, and the British patent of Coerper, No. 9,013 of 1887, and do not claim the constructions shown and described therein.

The invention will be described more particularly in connection with the accompanying drawings, in which—

Figure 1 is an end view, partly in section, of an armature embodying the features of the invention, and Fig. 2 is a plan of the armature.

Referring to the figures, F F indicate field-magnet poles, and A represents the body or core of an armature composed, in this instance, of laminæ of magnetizable material built up in any suitable manner, the laminæ being preferably separated by intervening strata of insulating material. The individual plates or laminæ are constructed with radial openings $c$, extending a short distance from the surface, and with slots or openings $b$, which extend in different directions from the openings $c$. The slots diverge from each other at such angles as to cause the two slots upon the opposite sides of each web $e$ thus formed to lie in the same chord of the circle of the armature. The plates may also be stamped or formed with openings G to remove the unnecessary metal. After the plates are formed they are laid up in the proper manner to form the entire armatur-core, the slots $b$ being placed opposite each other to form continuous openings through the entire length of the armature. These openings may be lined by pockets $h$ of insulating material—such, for instance, as vulcanized fiber—and the wires are then wound into the slots from the openings $c$ and around the respective webs $e$. Winding-clips $k$ may be placed at the respective ends of the armature opposite each web $e$ to hold the wires in the proper positions as they are wound in the slots and down upon the armature ends.

The wires having been wound into their proper positions, they may be held more securely in position by means of blocks K of non-magnetic material, placed at intervals or extending through the entire slots or openings $c$ and projecting into the slots $b$.

An armature constructed in the manner described is found to be very efficient in its operations and at the same time simple in its construction.

The connections between the armature-coils and the conductors or collecting-plates may be made in any usual well-known manner, according to the purposes desired to be served.

We claim as our invention—

1. A core for electrical machines, composed of plates of magnetizable material separated by insulation, said plates having diverging slots for receiving the armature-conductors and an opening to the exterior of the plate at the origin of the diverging slots.

2. A core-plate for electrical machines, stamped with diverging slots at intervals near its periphery and an opening to the periphery at the angle formed by each two diverging slots.

3. A core for electrical machines, composed of plates of magnetizable material separated by insulation, said plates having diverging slots for receiving the armature-conductors and an opening to the exterior of the plate at the origin of the diverging slots, the width of such openings being approximately equal to the width of the slot.

4. An armature-core for electric machines, consisting of plates of magnetizable material separated by insulation, having radial openings at intervals, slots diverging from said openings for receiving armature-coils, and winding blocks or clips at the ends of the core.

5. An armature-core for electrical apparatus, composed of plates of magnetizable material separated by insulation and having radial openings at intervals, slots extending in opposite directions from said openings for receiving wires, and insulating-linings for said slots.

6. An armature for electric machines, consisting of a laminated core formed with diverging slots for receiving the wires, said slots leaving intervening webs, and coils of wire wound in said slots.

7. An armature for electric machines, consisting of a laminated core formed with diverging slots for receiving the wires, said slots leaving intervening webs, coils of wire wound in said slots, and non-magnetizable material closing the openings of the adjacent slots outside the wires, substantially as described.

8. An armature for electric machines, consisting of a core having its outer surface continuous except for narrow longitudinal openings at intervals and having slots diverging from said openings, armature-coils wound in said slots, and blocks or strips of non-magnetizable material closing the openings and forming with the metal of the armature a practically continuous surface.

In testimony whereof we have hereunto subscribed our names this 25th day of June, A. D. 1889.

ALBERT SCHMID.
NIKOLA TESLA.

Witnesses:
  W. D. UPTEGRAFF,
  CHARLES A. TERRY.